United States Patent Office 3,489,790
Patented Jan. 13, 1970

---

3,489,790
1,2,3,4,5,6-HEXAFLUOROCYCLOHEPTATRIENES AND THEIR PREPARATION
Maurice L. Ernsberger, Wilmington, Del., assignor to E. I. du Pont de Nemours and Company, Wilmington, Delaware
No Drawing. Filed Jan. 12, 1966, Ser. No. 520,081
Int. Cl. C07c *17/32, 23/00*
U.S. Cl. 260—468           9 Claims

ABSTRACT OF THE DISCLOSURE

Described and claimed are selected 1,2,3,4,5,6-hexafluorocycloheptatrienes, e.g., perfluoro-7,7-dimethyl-1,3,5-cycloheptatriene, and their preparation from hexafluorobenzene and the appropriate diazo compound, e.g., bis(trifluoromethyl)diazomethane, either photolytically or thermally. The novel compounds are useful as degreasing agents for metals.

DESCRIPTION OF THE INVENTION

This invention relates to 1,2,3,4,5,6-hexafluorocycloheptatrienes and their preparation.

The novel compounds of this invention can be represented by the generic formula

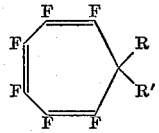

where R is hydrogen lower perfluoroalkyl, lower ω-chloroerfluoroalkyl, lower ω-hydropefluoroalkyl, lower alkyl and carboalkoxy

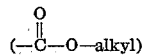

of 2 through 7 carbon atoms, and where R' is hydrogen, lower perfluoroalkyl, lower ω-chloroperfluoroalkyl or lower ω-hydroperfluoroalkyl. "Lower" is defined as containing 1 through 6 carbon atoms. The novel compounds are prepared by the process aspect of this invention which comprises reacting hexafluorobenzene with a diazo compound of the formula RR'CN$_2$, according to the equation

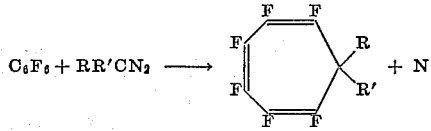

The reaction takes place photolytically or thermally. When photolytically, any wave length (λ) of light greater than 230 mμ may be employed. For example, an ordinary sunlamp may be used although lamps with higher intensities and narrower ranges of wave lengths may be of equal or greater value, depending upon the absorption properties of the reactants and the products. The photolytic reaction will take place over a temperature range of −80° C. to 50° C., and at suitable times to obtain the product. In general, the time of reaction will range from 1-7 days.

When the reaction takes place thermally, the temperature range will be between about 25° C.–200° C., and in general, times of 8 through 24 hours are employed, although lesser or greater times may be used, depending upon the amount of product desired. The foregoing temperatures and times of reactions for both the thermal and the photolytic processes are chosen merely for convenience and for maximum yields and are otherwise not critical.

Any ratio of reactants may be employed, although a ratio of 10–100 molar excess of hexafluorobenzene is preferred. If desired, although not necessary, a suitable catalyst such as finely divided glass, copper powder, copper halides, and the like, may be used to induce the thermal reaction to occur at lower temperatures.

The products are isolated by conventional procedures; for example, by distillation. The safety precautions normally employed for diazo compounds should also be employed in this process.

The following examples illustrate but are not intended to limit the novel products and process of this invention.

EXAMPLE I

Perfluoro-7,7-dimethyl-1,3,5-cycloheptatriene

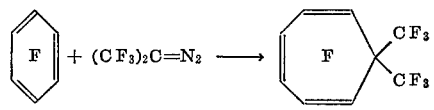

A 7 g. sample of bis(trifluoromethyl)diazomethane and 18 g. of hexafluorobenzene (excess) were heated at 150° for 8 hr. Distillation (spinning band) afforded 3.9 g. of a fraction boiling at 98–100° C. Gas chromatographic analysis revealed this fraction to contain a major product (68.8% of the area, 20% yield). The major "peak" was collected and shown to be perfluoro-7,7-dimethyl-1,3,5-cycloheptatriene on the basis of spectral data.

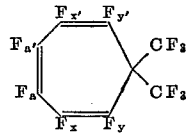

The F$^{19}$NMR (int. FCCl$_3$) shows a triplet (area 6) at +0.05 p.p.m. (J=17 c.p.s.; split further), assigned to the equivalent trifluoromethyl groups, and a symmetrical septet (area 2) at +61.3 p.p.m. (J=17 c.p.s.; split further) assigned to the $yy'$ fluorine atoms. The remaining fluorine atoms form a "weak-strong-strong-weak" pattern (with the weak and strong lines nearly equal in intensity, however) with halves (considerable further splitting) centered at +78.1 and +84.5 p.p.m., assigned at the $aa'$ and $xx'$ fluorines respectively on the basis of complexity of the splitting and their chemical shift. The ultraviolet spectrum showed $$\lambda_{max.}^{ethanol}\ 262\ (\epsilon\ 6,000)$$

and 222 mμ (ϵ 7,700), which is consistent with the tropylidene structure.

*Analysis.*—Calcd. for C$_9$F$_{12}$ (336.09): C, 32.16; F, 67.84. Found: C, 32.50; F, 68.51.

A low molecular weight polymer was formed when the tropylidene was irradiated in ether solution with ultraviolet light through quartz.

EXAMPLE II 7-carbethoxy-1,2,3,4,5,6-hexafluoro-1,3,5-cycloheptatriene

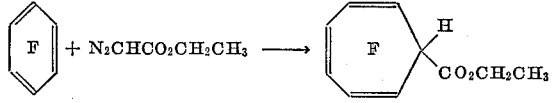

A 2 g. sample of ethyl diazoacetate was dissolved in 200 g. of hexafluorobenzene and irradiated for 96 hrs. with a sunlamp through Pyrex glass. One-half gram of copper powder was added and the suspension stirred and refluxed for 6 hrs. The copper powder was removed by filtration, most of the hexafluorobenzene was removed at 100 mm. (40°), and the remaining material was distilled through a spinning band column. The product, B.P. 55°

(2.5 mm.), about 0.5 g., was shown to be the fluorinated cycloheptatriene. The mass spectrum showed the parent ion at m/e 272 and peaks at m/e 244 (p-ethylene), 227 (p—OCH$_2$CH$_3$) and 199 (C$_7$F$_6$H$^+$). The ultraviolet spectrum in ethanol, 0.0186 g./liter, $\lambda_{max}$ 263 m$\mu$ ($\epsilon$ ~3,200), 230 m$\mu$ ($\epsilon$~5,200). The H$^1$ NMR showed a triplet (J=7) at $\tau$ 8.70 (—CH$_3$) and a quartet at $\tau$ 5.71 (CO$_2$CH$_2$—) superimposed on a multiplet for the methyne proton. The F$^{19}$ NMR showed multiplets of equal area at +6199, +8418.5 and +8719 c.p.s. (ext. FCCl$_3$) at 56.4 mc. The following assignments were made using F—F and F—H spin-spin decoupling:

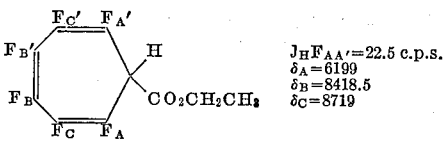

$J_{HF_{AA'}}$=22.5 c.p.s.
$\delta_A$=6199
$\delta_B$=8418.5
$\delta_C$=8719

When the BB'CC' portion of the spectrum (A decoupled) were assigned $J_{BB}$=19, $J_{BC}$=$J_{B'C'}$=3.5, $J_{B'C}$=$J_{BC'}$=26.5 and $J_{CC'}$=1 or 2, reasonable fits were obtained when comparing observed and computer-calculated spectra.

*Analysis.*—Calcd. for C$_{10}$H$_6$F$_6$O$_2$ (272.15), C, 44.13; H, 2.22. Found: C, 44.17; H, 2.77.

The diazo compounds employed as reactants in the process of this invention in which R and R' are perfluoroalkyl are prepared by oxidation of the corresponding hydrazones, preferably with lead tetraacetate in a carbonitrile solvent such as benzonitrile (as described in U.S. Patent 3,242,166). The other diazo reactants can be prepared by standard methods (described by H. Zollinger in "Azo and Diazo Chemistry," Interscience Publishers, Inc., New York (1961), chapters 1 and 5).

By employing the process of either Example I or II, the following diazo compounds can be reacted with hexafluorobenzene to produce the corresponding product.

Specific examples are given as follows:

TABLE 1

| Diazo Compound | Product |
|---|---|
| H$_2$CN$_2$ | |
| Diazomethane | 7,7-dihydroperfluoro-1,3,5-cycloheptatriene |
| ClCF$_2$(CF$_2$)$_4$\\CN$_2$ / CF$_3$ | |
| ($\omega$-Chloroperfluoropentyl)(perfluoromethyl)diazomethane | 7-($\omega$-chloroperfluoropentyl)-7-(perfluoromethyl)-perfluoro-1,3,5-cycloheptatriene |
| C$_6$H$_{13}$OCO\\CN$_2$ / H | |
| Cyclohexyl diazoacetate | Cyclohexyl 7-hydroperfluoro-1,3,5-cycloheptatriene-7-carboxylate |
| C$_6$H$_{13}$\\CN$_2$ / H | |
| Cyclohexyldiazomethane | 7-cyclohexyl-7-hydroperfluoro-1,3,5-cycloheptatriene |
| CF$_3$\\CN$_2$ / H | |
| (Trifluoromethyl)diazomethane | 7-(trifluoromethyl)-7-hydroperfluoro-1,3,5-cycloheptatriene |

TABLE I—Continued

| Diazo Compound | Product |
|---|---|
| C$_3$F$_7$\\CN$_2$ / H | |
| (Perfluoropropyl)diazomethane | 7-hydro-7-(perfluoropropyl)perfluoro-1,3,5-cycloheptatriene |
| HCF$_2$(CF$_2$)$_4$\\CN$_2$ / HCF$_2$(CF$_2$)$_4$ | |
| bis($\omega$-Hydroperfluoropentyl) diazomethane | 7,7-bis($\omega$-hydroperfluoropentyl)perfluoro-1,3,5-cycloheptatriene |
| ClCF$_2$\\CN$_2$ / ClCF$_2$ | |
| bis(Chlorodifluoromethyl)diazomethane | 7,7-bis(chlorodifluoromethyl)perfluoro-1,3,5-cycloheptatriene |
| CF$_3$(CF$_2$)$_5$\\CN$_2$ / CF$_3$(CF$_2$)$_4$ | |
| (Perfluorohexyl)(perfluoropentyl)diazomethane | 7-(perfluorohexyl)-7-(perfluoropentyl)perfluoro-1,3,5-cycloheptatriene |
| CF$_3$\\CN$_2$ / CH$_3$OCO | |
| Methyl 3,3,3-trifluoro-2,2-diazopropionate | Methyl 7-(trifluoromethyl)perfluoro-1,3,5-cyclophetatriene-7-carboxylate |
| CH$_3$\\CN$_2$ / CF$_3$ | |
| Methyl(perfluoromethyl)diazomethane | 7-methyl-7-perfluoromethyl-perfluoro-1,3,5-cycloheptatriene |

Because of the readily preparable diazo reactants, preferred compounds of this invention are those in which R' is hydrogen, or those in which R and R' are the same. Most preferred compounds are those in which R and R' are hydrogen or the fluorine-containing groups.

The novel compounds of this invention are useful as degreasing agents for metals. For example, strips were cut from a steel coupon coated with an oily film to protect it from rusting. One strip was held several minutes in the vapors of the hexafluorobenzene/ethyl diazoacetate reaction product of Example II. This strip, together with an untreated strip, was placed in a beaker containing a few drops of water. The treated strip rusted rapidly while the untreated strip did not.

Since it is obvious that many changes and modifications can be made in the above-described details without departing from the nature and spirit of the invention, it is to be understood that the invention is not to be limited to said details.

The embodiments of the invention in which an exclusive property or privilege is claimed are defined as follows:

1. 1,2,3,4,5,6-hexafluorocycloheptatrienes represented by the formula wherein R' is hydrogen, lower perfluoroalkyl, lower $\omega$-chloroperfluoroalkyl, or lower $\omega$-hydroperfluoroalkyl, and R is R', lower alkyl, or carboalkoxy of 2 through 7 carbon atoms.

2. Compounds of claim 1 wherein R and R' are hydrogen, lower perfluoroalkyl, lower ω-chloroperfluoroalkyl or lower ω-hydroperfluoroalkyl.

3. The compound of claim 1 wherein R and R' are hydrogen.

4. The compound of claim 1 wherein R and R' are lower perfluoroalkyl.

5. The compound of claim 1 wherein R and R' are perfluoromethyl.

6. The compound of claim 1 wherein R' is hydrogen and R is carboethoxy.

7. Process for preparing the compounds of claim 1 which comprises reacting hexafluorobenzene with a compound of the formula $RR'CN_2$ wherein R and R' are defined as in claim 1 photolytically at temperatures of from about −80° C. to +50° C.

8. The process of claim 7 wherein the wavelengths employed are greater than 230 mμ.

9. Process for preparing the compounds of claim 1 which comprises reacting hexafluorobenzene with a compound of the formula $RR'CN_2$ wherein R and R' are defined as in claim 1 at temperatures of from about 25–200° C.

References Cited

UNITED STATES PATENTS 3,110,735  11/1963  ter Borg et al. _____ 260—606.5
3,126,397  3/1964  ter Borg et al. _____ 260—350

OTHER REFERENCES

Migrdichian: Organic Chemistry (vol. II), Reinhold Publ. Co., N.Y. (1957), pp. 1148 and 1153.

LORRAINE A. WEINBERGER, Primary Examiner

P. J. KILLOS, Assistant Examiner

U.S. Cl. X.R.

204—158, 163; 260—648